July 10, 1928.
C. W. FREDERICK
1,676,540
CAMERA FINDER
Filed May 27, 1926
2 Sheets-Sheet 1
FIG_1_
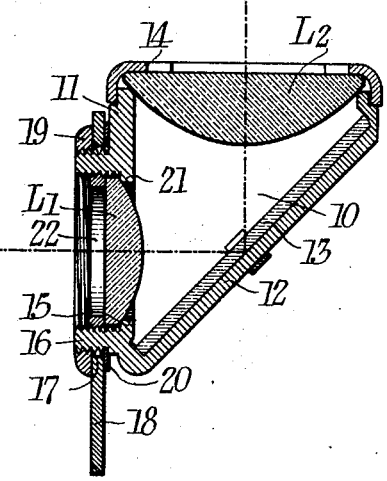
FIG_2_
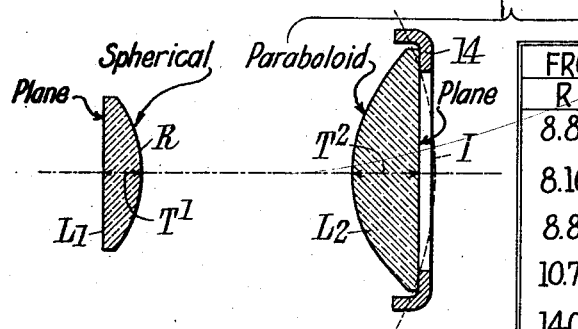
| FRONT LENS | | REAR LENS | |
|---|---|---|---|
| R | T1 | FORMULA | T2 |
| 8.87 | 2.0 | $Y^2 = 22X$ | 3.6 |
| 8.16 | 2.5 | $Y^2 = 22X$ | 3.9 |
| 8.87 | 2.5 | $Y^2 = 24X$ | 4.5 |
| 10.70 | 3.5 | $Y^2 = 28X$ | 5.2 |
| 14.00 | 3.4 | $Y^2 = 3.8X$ | 5.1 |
Charles W. Frederick,
INVENTOR,
BY R.L. Stinchfield
M. Perrins
ATTORNEYS.

July 10, 1928.
C. W. FREDERICK
CAMERA FINDER
Filed May 27, 1926
1,676,540
2 Sheets-Sheet 2
FIG - 3 -
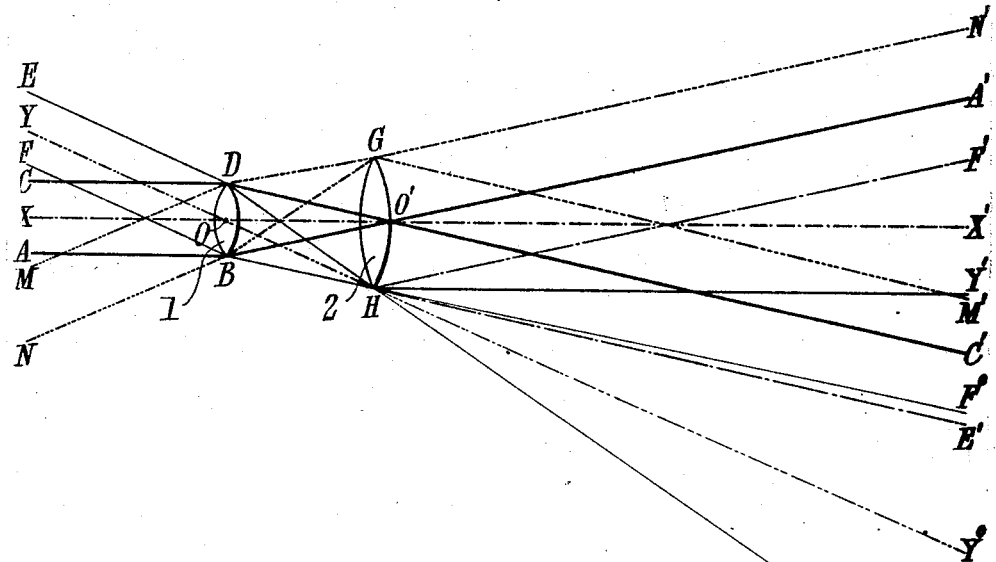
FIG - 4 -
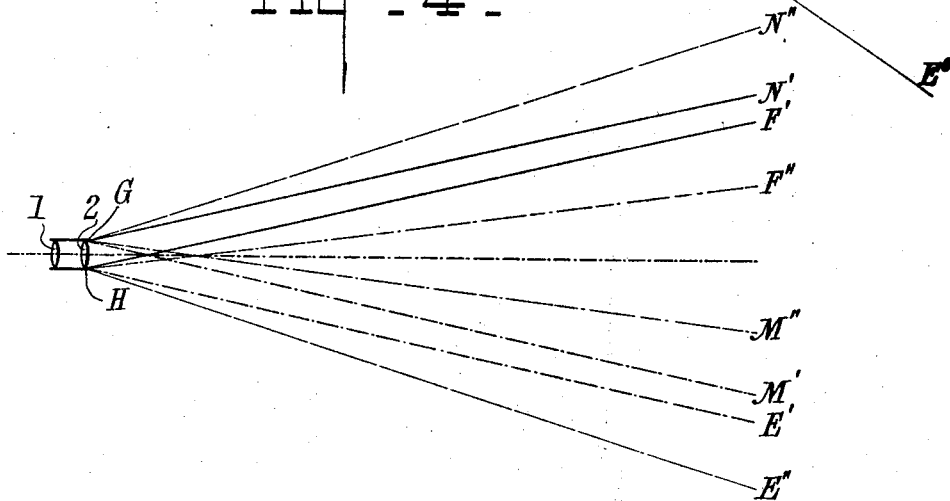
Charles W. Frederick,
INVENTOR.
BY
ATTORNEYS.

Patented July 10, 1928.

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

CAMERA FINDER.

Application filed May 27, 1926. Serial No. 112,107.

This invention relates to camera finders and more particularly to the optical system for a finder of the "brilliant type" which is inexpensive to manufacture and designed to give a particularly brilliant image, visible over a wide angle, free from parallex, and of good optical properties for its intended use.

The optical system for the type of camera finder known as a "brilliant" finder consists of two convergent lenses spaced by a distance approximating the focal length of the front lens. Theoretically the lenses are of the same focal length.

In order to point out the advantages inherent in my improved system it appears desirable to discuss briefly the theory of the optics of this type.

It will accordingly be necessary to refer to the figures of the accompanying drawings, wherein the same elements are designated by the same reference characters throughout and in which Fig. 1 is a section of a finder embodying my improved system;

Fig. 2 is a section of the optical system with a series of formulae that are applicable;

Figs. 3 and 4 are diagrams used in discussing the optical theory of this system.

In Fig. 3 the lenses designated 1 and 2 respectively are shown as biconvex and are of the same focal length and aligned on the optical axis XOO'X'. The front lens is made of smaller diameter than the rear lens, the latter serving to define the field and being of a size to cover the desired area. Rays parallel to the axis and included within the beam AB—CD are brought to a focus at O', at or near the rear surface of lens 2. In the absence of lens 2, they would proceed in a spreading conical beam included within the limiting rays O'A' and O'C'; and the placing of the lens 2 at about the position indicated does not affect the position of these rays to an appreciable extent. The rear image at O' of a distant point on the axis would be visible to the eye of an observer anywhere within the cone between O'A' and O'C'.

Oblique rays parallel to a central line YO and included within the beam ED—FB, are brought to a focus at a point H at or near the edge of the rear surface of lens 2, and if the lens 2 were not present would proceed within the cone defined by HF° and HE°, the central ray being OHY°. The point H would be visible from a point between F° and E°. The interposition of the lens 2, however, refracts this beam, so that it is bent toward the axis; and, if the lenses are of the same focal length, the rays of the refracted beam will be parallel to those emanating from corresponding rays parallel to the axis. That is, the central ray will be HY' parallel to the central ray O'X' of the first beam, and the limiting rays will be HF' and HE', parallel to O'A' and O'C' respectively. The real image at H of a distant point on the line OY will be visible to the eye of an observer anywhere within the cone between HF'—HE'.

Similarly rays from an oblique beam MD—NB will be brought to a focus at G which will be visible from within the cone GN—GM'.

It is thus apparent that if the lens 2 were not present the cones of rays O'A'—O'C'; and HF°—HE° do not overlap, and there would be no point at which the entire image GO'H would be visible. When, however, a lens 2 of focal length equal to lens 1, is used, it is obvious that the entire image GO'H is visible from the area between points F' and M'; that it is entirely invisible outside of point N' and E' and that from the boundary area N'F' and M'E' a portion only of the image is visible, the width of this boundary area being the diameter of the rear lens.

In Fig. 4 part of the diagram is shown on a smaller scale, and the relative proportion of this marginal area at some distance from the finder is more plainly shown. The zone between N' and F' and between M' and E is seen to be relatively small compared to the area F'M', at some distance from the lenses. Since the finder will ordinarily be viewed from an appreciable distance, the effect will be that there is a reasonably large limit within which the entire image is visible and that it becomes entirely invisible at a narrowly limited boundary.

In practice, for reasons which will be later discussed, the rear lens is made of somewhat larger focus than the front lens. The oblique rays do not emerge parallel to corresponding rays of an axial beam but may lie within cones bounded by the rays GN''—GM'' and HF''—HE''. If the rear lens has a focal length much greater than the front lens, the central zone F″M″, from which the entire image is visible, will be relatively small and the boundary zone N″F″—M″E″ from which the image is partially visible will be relatively larger. As the rear focal length approaches that of the front lens the central zone becomes larger and the boundary zone smaller.

The above discussion relates, it is to be understood, to a theoretical system that is not realized in practice. Some of the principal limiting factors will be mentioned.

The lenses used are small and to make them with curvatures so steep as to give the desired short focal lengths is expensive. The cheapest form of lens has one surface plane, but in this type all the power will be in a single surface which would have so much curvature that the light striking the convex surface near the edges would be tangent or nearly tangent to the curved surface of the glass and fail to enter it, that is, would be externally reflected, so that only the central rays would penetrate the system. Light entering from the plane side of a plano convex lens with a very strong curvature would be subject to total internal reflection near the edges. The effect of this in the front element is merely to lessen the total illumination, like a diaphragm, but in the rear element it cuts down the field observed by the user.

The lenses used are necessarily, by reason of cost, uncorrected simple elements and there would be unavoidably present an excessive amount of spherical aberration when the lenses are made of the power theoretically required. Even in the forms ordinarily used there is an undesirable amount.

One of the ways in which this is most evident is in the spherical aberration of the oblique rays. That is, the cone HF′—HE′ is not circular in cross section but is much distorted in shape, radially of the axis, the visible image being distorted in shape and of uneven illumination.

There are several expedients by which these objections have been more or less overcome. The use of biconvex lenses instead of plano convex permits the making of surfaces flat enough to avoid total reflection near the edges but these are more expensive than plano-convex lenses and the amount of spherical aberration is not greatly lessened by their use.

The front lens may be made of large diameter approaching that of the rear lens. This increases the angular size of the cone of light and permits the power, and therefore, the curvature, to be diminished in the rear lens, thus rendering possible the use of spherical curves and of a plano-spherical lens with the plane side out.

These are, however, more expensive than the smaller lenses, and, moreover, make the finder as a whole more bulky than is desired in a compact camera; and the rear lens will have a long focal length.

The lenses can be made of rather long focus, with flat curves. In this case, if separated by their focal length, the dimensions of the finder will become undesirably greater. If they are separated by a distance less than the focal length, two objections are met with. If the front lens has a focal length longer than the separation, the real image is behind the rear lens and does not appear to be fixed with regard to the frame of the finder window. If the user moves his eye transversely of the finder, the image will appear to move, the result in practice being that unless he looks axially at the finder, the field that he sees is not identical with the intended one. This fault is known as parallax. If the rear lens has a longer focus than the separation, it does not refract the oblique rays sufficiently to bring them into parallelism with the corresponding rays from other angles. That is, referring again to Figure 4, the effect of having the focal length of 2 materially greater than the distance between 1 and 2, will be that the area F″M″ within which the entire image is visible is small and the zones N″F″ and M″E″ from which the image is partially visible are greater. In practice the user will see the entire field when his eye is in line with the finder, but as he moves it to the side the visible field will be gradually masked down from one side.

I have found that these objections can be lessened to a greater extent than by any of the expedients formerly adopted by the use, particularly for the rear lens, of a plano convex lens, the convex surface of which is a paraboloid of revolution about the optical axis.

Such a lens is inexpensive to manufacture because a high degree of surface polish is not necessary in a finder and the required surface of sufficient smoothness can be made by molding or pressure in a suitable die and the other or plane surface ground down, neither of these operations being costly.

For the same focal length the curvature at the edges is less than in a spherical surface. This eliminates total reflection and spherical aberration, and makes it possible to use a lens that has a much shorter focal length than is possible with a plano-convex spherical lens.

As stated above, the focal length of the rear lens is somewhat greater than the separation, because if it were focussed on the front element any defects or dust on the front lens would be superposed on the visible image. If it is made about one-third greater, the boundary zones of partial visibility of the image are not unduly great, whereas where two spherical lenses are used, it has been customary to make the focal length of the rear lens about twice the separation, in which case there is an objectionably large zone from which the image is only partially visible.

A finder embodying my improved system is shown in Fig. 1 and is of the usual reflecting form, comprising a front element $L_1$ and a rear element $L_2$, these being plano convex, with their plane surfaces out. They are supported in a frame 10 here shown as having an upright front wall 11, and angular rear wall 12, carrying the mirror 13, and an upper masking member 14. The rear lens $L_2$, usually termed the "brilliant", is held in place between the mask member and the upper extensions of walls 11 and 12. The front wall has an aperture 15, about which is a forwardly extending tube 16, screw threaded inside and out, and extending through an aperture 17 in the lens board 18. A nut 19 holds the finder in place, 20 being a washer. The front lens $L_1$ is held in place in the tube 16, against shoulder 21 by the threaded ring 22.

Some of the combinations found satisfactory are the following, all the lenses being made of white optical crown glass, having an index of 1.510 and the front lens being in each case a plano convex lens with a spherical surface in the rear, and the rear lens being a plano convex lens with a paraboloidal surface in front. R indicates the radius of curvature of the spherical surface; $T_1$ and $T_2$ the respective thicknesses; and $F_1$ and $F_2$ the focal lengths of the lenses.

| Front lens | | | Rear lens | | |
|---|---|---|---|---|---|
| R | $T_1$ | $F_1$ | Formula | $T_2$ | $F_2$ |
| 8.87 | 2.0 | 17.4 | $Y^2=22X$ | 3.6 | 21.5 |
| 8.16 | 2.5 | 16.0 | $Y^2=22X$ | 3.9 | 21.5 |
| 8.87 | 2.5 | 17.4 | $Y^2=24X$ | 4.5 | 23.5 |
| 10.70 | 3.5 | 21.0 | $Y^2=28X$ | 5.2 | 27.4 |
| 14.00 | 3.4 | 27.4 | $Y^2=38X$ | 5.1 | 37.2 |

The separation between the elements is such that the image will be properly framed in the masking frame 14. Since the lenses are simple ones, the image will be curved as indicated at dotted lines at I. The rear surface of $L_2$ and mask 14 will be so positioned that they will be substantially at the point where they will intercept the edge of the image, rather than at its axial point. There will then be no parallax and the image, as viewed, will be stationary with respect to the mask.

Since the degree of precision in finder lenses is not great, the separation for any particular combination is in practice determined empirically, rather than mathematically, but in general the locus of the image will be at approximately the position indicated at I in Fig. 2.

Having thus described my invention, what I claim as new and desire to secure by Letters Patent is:

1. A camera finder comprising two spaced positive lenses, spaced by a distance approximating the focal length of one of the lenses, and one surface of one of the lenses being a paraboloid.

2. A camera finder comprising two spaced positive lenses, and a mask behind the rear lens at approximately the focal point of the front lens, one of the surfaces of the rear lens being a paraboloid.

3. A camera finder comprising two spaced positive lenses, and a mask behind the rear lens at approximately the focal point of the front lens, the rear lens being a plano convex lens, the convex surface of which is a paraboloid.

4. A camera finder comprising two spaced positive lenses, and a mask behind the rear lens at approximately the focal point of the front lens, the rear lens being a plano convex lens, the convex surface of which is a paraboloid and faces forwardly.

5. A camera finder comprising two spaced plano convex lenses on a common axis with their plane surfaces facing outwardly, the convex surface of the front lens being spherical, and the convex surface of the rear lens being a paraboloid of revolution about the axis of the lenses and a mask adjacent the plane surface of the rear lens and separated from the front lens by approximately its focal length, the focal length of the rear lens being less than 1.4 of the focal length of the front lens.

Signed at Rochester, New York this 24th day of May, 1926.

CHARLES W. FREDERICK.